United States Patent
Gibson et al.

(10) Patent No.: US 7,645,931 B2
(45) Date of Patent: Jan. 12, 2010

(54) APPARATUS TO REDUCE THE COST OF RENEWABLE HYDROGEN FUEL GENERATION BY ELECTROLYSIS USING COMBINED SOLAR AND GRID POWER

(75) Inventors: Thomas L. Gibson, Utica, MI (US); Nelson A. Kelly, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 367 days.

(21) Appl. No.: 11/691,571

(22) Filed: Mar. 27, 2007

(65) Prior Publication Data

US 2008/0236647 A1  Oct. 2, 2008

(51) Int. Cl.
   *H01M 16/00* (2006.01)
(52) U.S. Cl. .............................. 136/244; 429/9; 363/79
(58) Field of Classification Search ......... 136/243–244; 205/334, 337, 340; 429/12–14
   See application file for complete search history.

(56) References Cited

U.S. PATENT DOCUMENTS 4,404,472 A * 9/1983 Steigerwald ............... 307/46
5,869,956 A * 2/1999 Nagao et al. ............... 323/299
2005/0189234 A1* 9/2005 Gibson et al. .............. 205/337
2006/0088739 A1 4/2006 Ovshinsky
2006/0192435 A1* 8/2006 Parmley ..................... 307/66
2007/0079611 A1* 4/2007 Doland ....................... 60/495

OTHER PUBLICATIONS

European Search Report, May 8, 2008, Application No. EP 0800 4019.9, 9 pages.
Pierre Hollmuller et al, Evaluation of a 5 k Wp Photovoltaic Hydrogen Production, International Journal of Hydrogen Energy 25 (2000) 97-109.
J. M. Vidueira et al, PV Autonomous Installation to Produce Hydrogen Via Electrolysis, Internal Journal of Hydrogen Energy 28 (2003) 927-937.
Frano Barbir, PEM Electrolysis for Production of Hydrogen From Renewable Energy Sources, Solar Energy 78 (2005) 661-669.
Shaohong Wu et al, Distributed Data Acquisition and Monitoring System for an Integrated Energy Application, National Research Council Canada.

* cited by examiner

*Primary Examiner*—Jessica L. Ward
*Assistant Examiner*—Kevin E Yoon

(57) ABSTRACT

One embodiment of the invention includes a PV array and an electrolyzer operatively connected together and each operatively connected to a utility power grid so that electricity produced by the PV array is selectively delivered to the utility power grid and the electrolyzer. The resulting process increases the efficiency of the solar-hydrogen production process, and results in lower-cost renewable hydrogen.

10 Claims, 2 Drawing Sheets

APPARATUS TO REDUCE THE COST OF RENEWABLE HYDROGEN FUEL GENERATION BY ELECTROLYSIS USING COMBINED SOLAR AND GRID POWER

TECHNICAL FIELD

The field to which the disclosure generally relates includes hydrogen generation by electrolyzers, and more specifically, reducing the cost of renewable hydrogen generation.

BACKGROUND

Hydrogen generation devices use electricity to produce hydrogen (and oxygen) by electrolysis of water in an electrolyzer. The hydrogen generated is stored for use as a fuel, useable in fuel cells and internal combustion engines. The oxygen is vented to the atmosphere. Electrolyzers may be powered by solar energy. Solar hydrogen generation by a photovoltaic-electrolyzer (PV-electrolyzer) is a renewable and environmentally beneficial energy source. Converting U.S. fuel supplies to renewable energy sources is essential for sustainable transportation, sustainable economic growth, reducing greenhouse gas emissions, and for national energy security by replacing polluting fossil fuels imported from unstable regions overseas.

It is not economical to directly connect solar electricity from photovoltaic arrays (PV arrays) alone to power an electrolyzer and produce exclusively renewable hydrogen fuel, although a direct connection method, with the maximum power point voltage of the PV array matching the electrolyzer operating voltage, would give the highest efficiency conversion of solar energy to hydrogen. This lack of economy arises because solar power from a fixed angle PV system is produced effectively for only about six hours per day on average, leaving 18 hours per day when solar electricity production is too little for hydrogen generation and the electrolyzer can not be used. Thus, the electrolyzer is idle most of the time, which increases the size and cost of electrolyzer required for a desired daily fuel production rate. In addition, the electrolyzer is currently the most expensive part of a hydrogen generator system. Therefore, other solutions are needed to make solar powered electrolytic hydrogen production economically viable.

SUMMARY OF EXEMPLARY EMBODIMENTS OF THE INVENTION

One embodiment of the invention includes a PV array and an electrolyzer operatively connected together and each operatively connected to a utility power grid so that electricity produced by the PV array is selectively delivered to the utility power grid and the electrolyzer.

Other exemplary embodiments of the invention will become apparent from the detailed description of exemplary embodiments provided hereinafter. It should be understood that the detailed description and specific examples, while indicating the exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings.

DETAILED DESCRIPTION OF EXEMPLARY EMBODIMENTS

The following description of embodiments is merely exemplary in nature and is in no way intended to limit the invention, its application, or uses.

Figure 1:
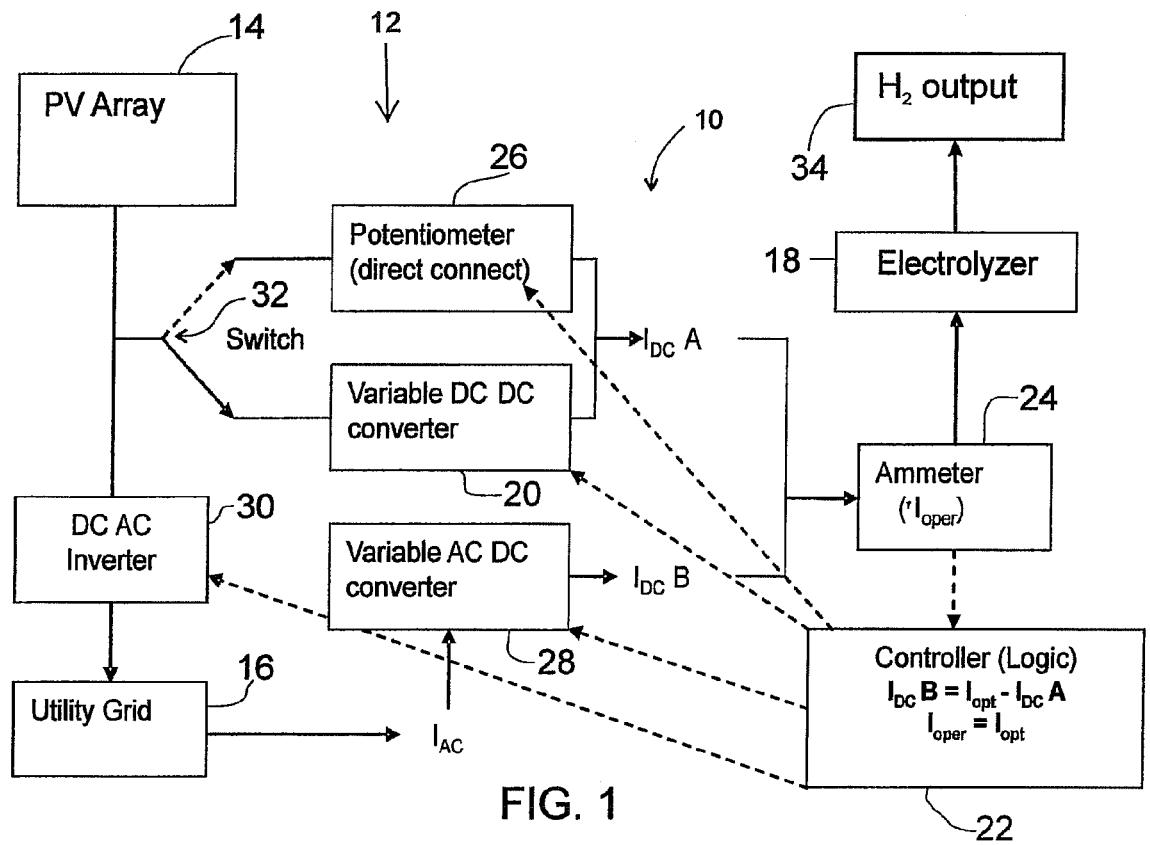
FIG. 1 is a block diagram of the power control system that selectively delivers electricity from the PV array to the utility power grid and the electrolyzer, according to one embodiment of the invention.

FIG. 1 is a block diagram of a product 10 comprising a power control system 12. The power control system 12 combines at least one of PV power (DC current) from a PV array 14 or AC power from a utility power grid 16 to power an electrolyzer 18. The PV array 14 may be any suitable PV array, including, but not limited to crystalline silicon, amorphous silicon, cadmium telluride, and copper indium diselenide based PV modules. These PV modules can include, but are not limited to, the Sharp NT-S5E1U model manufactured by Sharp Electronics Corp., Huntington Beach, Calif., available from AAPS Alternative Power Systems, Carlsbad, Calif., USA; the Sanyo HIP-190BA3 module manufactured by Sanyo Solar (part of Sanyo Electric Co., Ltd., Japan), which is available from Alternative Energy Store, LLC, Hudson, Mass.; and other suitable PV modules.

The electrolyzer 18 produces hydrogen and oxygen by the electrolysis of water. The electrolyzer 18 may be any suitable electrolyzer. The electrolyzer 18 may be a proton exchange membrane (PEM) electrolyzer including an anode, a cathode and a membrane in between or any other suitable electrolyzer. The electrolyzer 18 may be a high-pressure electrolyzer.

The hydrogen output 34 of the electrolyzer 18 is collected and stored at an appropriate pressure and used as a fuel. By combining the solar power with another source of electricity, such as grid electricity from utilities, the electrolyzer 18 can be operated 24 hours a day if desired, and solar powered electrolytic hydrogen production can be economically viable, because the cost to produce a desired amount of hydrogen fuel is reduced.

In one embodiment, the PV power is routed to a variable DC DC converter 20, where the current and voltage are converted to the predetermined optimum operating current ($I_{opt}$) and optimum operating voltage ($V_{opt}$) for the electrolyzer 18. The variable DC DC converter 20 may be a variable output DC power supply circuit consisting of internal potentiometers, wire coils, semiconductors, and other electronics. The output of the variable DC DC converter 20 is electrically connected to the electrolyzer 18.

The variable DC DC converter 20 is controlled by a preprogrammed controller (logic system) 22, including, for example, a mainframe computer or microprocessor and associated circuits, switches, and wiring. An ammeter 24 connected to the electrolyzer 18 and the controller 22 measures the total DC current input to the electrolyzer 18. The controller 22 uses the signal from the ammeter corresponding to this total DC current input to the electrolyzer 18 to set the current flow originating from the PV array 14 (defined as $I_{DC}A$) and the current flow originating from the utility power grid 16 (defined as $I_{DC}B$) so that the total current flow to the electrolyzer 18 ($I_{DC}A+I_{DC}B$) equals the optimum operating current ($I_{opt}$) of the electrolyzer. The optimum current is based on cost, and $I_{opt}$ is the operating current at which the solar powered electrolyzer produces hydrogen at the lowest cost.

In another embodiment, the PV array 14 is routed directly to the electrolyzer 18 through a potentiometer 26 instead of through the variable DC DC converter 20. The alternative circuit with direct connection has less resistance and allows greater system efficiency than the circuit with the variable DC DC converter 20. A switch 32 may be manually operated and the potentiometer 26 may be controlled by the controller 22. The switch 32 determines whether the current is routed through the potentiometer 26 or through the variable DC DC converter 20. The direct connection through the potentiometer is used when the PV array 14 has been designed and constructed to supply the optimum operating voltage ($V_{opt}$) required by the electrolyzer 18 without using a variable DC DC converter 20. When using this alternative (direct connection) circuit, the ammeter 24 measures the total DC current input to the electrolyzer 18. The controller 22 uses this total DC current input to the electrolyzer 18 to set the current flow from the PV array 14 (defined as $I_{DC}A$) and the current flow from the utility power grid 16 (defined as $I_{DC}B$) so that the total current flow to the electrolyzer 18 ($I_{DC}A+I_{DC}B$) equals the optimum operating current ($I_{opt}$) of the electrolyzer.

The PV array 14 is electrically connected to the input of a variable DC AC inverter 30. The variable DC AC inverter 30 converts the solar DC electricity to AC electricity with current, voltage, and wave form required for electricity sold to the utility power grid 16. The variable DC AC inverter 30 is a variable output AC power supply or transformer circuit consisting of internal potentiometers, wire coils, semiconductors, and other electronics. The output of the variable DC AC inverter 30 is connected to the utility power grid 16 in order to sell excess PV power not immediately required to run the electrolyzer 18. This AC current output to the grid is also controlled by the controller 22.

The potentiometer 26 may be used when necessary to control the ratio of current flowing to the electrolyzer 18 and current flowing to the utility power grid 16 through the variable DC AC inverter 30 so that the predetermined $I_{opt}$ is maintained. The potentiometer 26 can be adjusted through a range of resistance to control the percentage of the total PV generated current that flows directly to the electrolyzer 18 and the percentage of the PV generated current that flows to the variable DC AC inverter 30. The potentiometer 26 can be set to approximately zero ohms resistance so that a direct connection is established between the PV array 14 and the electrolyzer 18. Alternatively, the potentiometer 26 can be adjusted to any value of resistance needed to split the PV generated current in any desired ratio between the electrolyzer 18 and the variable DC AC inverter 30. In one embodiment, about 75% of the total PV electric power is routed to the variable DC AC inverter 30 and about 25% of the total PV current is sent directly to the electrolyzer 18. This split ratio may provide sufficient renewable PV power to the grid during daytime to equal and balance the grid power taken from the electric utility and used to operate the electrolyzer when PV power is not available due to insufficient sunlight. To minimize power losses, the variable resistance of the potentiometer 26 is kept as small as possible consistent with the need to maintain the desired splitting ratio between the electrolyzer 18 and the variable DC AC inverter 30.

Because the PV array 14 can only produce solar electricity to operate the electrolyzer 18 in daylight hours, power from the utility power grid 16 is required for cost effective hydrogen fuel generation. However, since the primary reason for making and using hydrogen fuel is environmental, the use of grid electricity preferably should be avoided unless it is generated renewably. To make the hydrogen production completely renewable, an oversized PV array 14 may be used to produce sufficient solar power during the daylight hours to operate the electrolyzer 18 and to produce surplus solar power to be transmitted (sold) to the utility power grid 16. This surplus solar energy can be seen as energy stored for later use in the utility power grid like a bank deposit. The utility power grid 16 then sells an equal amount of power back to the hydrogen generation system at night to operate the electrolyzer 18 during the hours of darkness. This power from the utility power grid 16 which is sold back to the hydrogen generation system is considered "renewable" or "green" energy because it is equally balanced by the solar PV electricity sold to the utility power grid in the daytime. During full daylight, the PV output may be larger than the optimum current required by the electrolyzer: part of the PV output goes through the variable DC DC converter to operate the electrolyzer, and the rest of the PV output goes through the variable DC AC inverter to be sold to the utility power grid. Thus, the hydrogen produced by the electrolyzer can be completely classified as a renewable fuel. In one embodiment, the total renewable electricity flow from the PV system to the utility grid corresponds to the amount of renewable electric energy required to operate the electrolyzer and to produce a desired amount of renewable hydrogen fuel.

Figure 2:
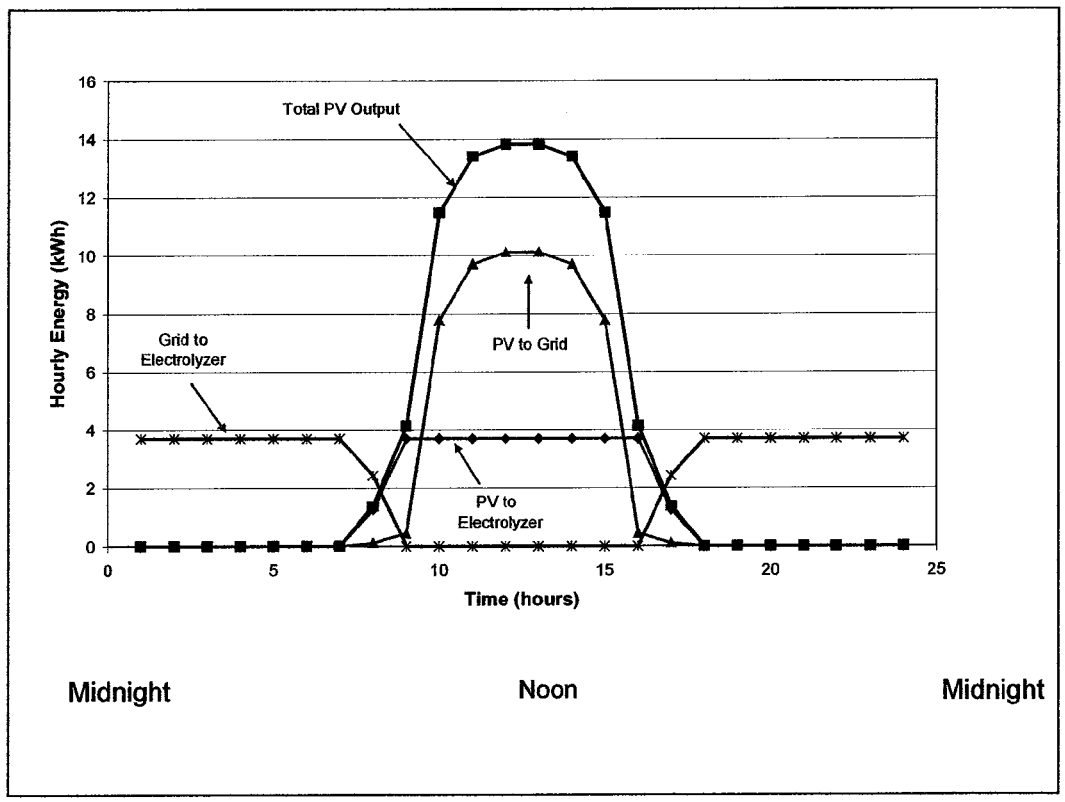
FIG. 2 illustrates the relationship between hourly energy (kWh) and the time over a 24-hour period for the utility power grid, PV array, and electrolyzer.

FIG. 2 illustrates a combination of solar power and grid power supplying the electrolyzer with power 24 hours a day. As shown in FIG. 2, during the middle of the 24-hour period, excess solar power (from the PV array) is sold to the utility grid. At the beginning and end of the 24-hour period, power is sold from the utility grid to the system to power the electrolyzer when the PV array is incapable of producing enough power.

In one embodiment, power from the utility power grid enters the power control system 12 at night and at other times of low sunlight. The utility power grid 16 is connected to a variable AC DC converter 28 that converts AC power from the grid ($I_{AC}$) to the optimum DC current and voltage to operate the electrolyzer 18 when combined with any PV current available at the time. The variable AC DC converter 28 is a variable output DC power supply circuit consisting of internal potentiometers, wire coils, semiconductors, and other electronics. The variable AC DC converter 28 is also controlled by the controller 22 so that the combined PV current ($I_{DC}A$) and grid current input ($I_{DC}B$) to the electrolyzer 18 equals the optimum operating current for the electrolyzer ($I_{opt}$).

Thus, the PV system may be built large enough to generate enough electricity to operate the electrolyzer at its optimum current 24 hours per day and 365 days per year based on minimizing hydrogen cost. Since the number of hours of sunshine per day varies seasonally and can vary hourly with weather conditions, the total area of the PV array can best be sized for average conditions. The total annual PV output predicted for the location and PV module orientation should equal the total annual power input of the electrolyzer at its optimum current. Thus, in a given year, there may be a surplus or deficit in the renewable solar energy produced by the PV system, but the long term renewable energy supply will average out to equal the electrolyzer input required for 100% renewable hydrogen fuel production. The annual average number of peak sun hours of insolation (incident solar radiation) for various PV systems in numerous U.S. locations has been measured and published in standard tables by the U.S. Department of Energy National Renewable Energy Laboratory. Annual PV module output can be determined by power output measurements under various seasonal conditions, or manufacturers provide data for the power, current, and voltage output of their products under standard solar radiation which can be corrected for temperature under normal operating conditions. The average daily PV system output (kWh) can be estimated by multiplying the average peak sun hours times the average PV module power output if both averages are determined for all seasons.

In another embodiment, the amount of PV energy generation capacity (kWh) that will be stored in the utility power grid 16 and recovered for later use may be increased by 10-20% to account for greater losses in the two power conversion steps and longer wiring required. The expected power loss from each DC DC or AC DC converter or DC AC inverter in a circuit is expected to be 5-10%.

Figure 3:
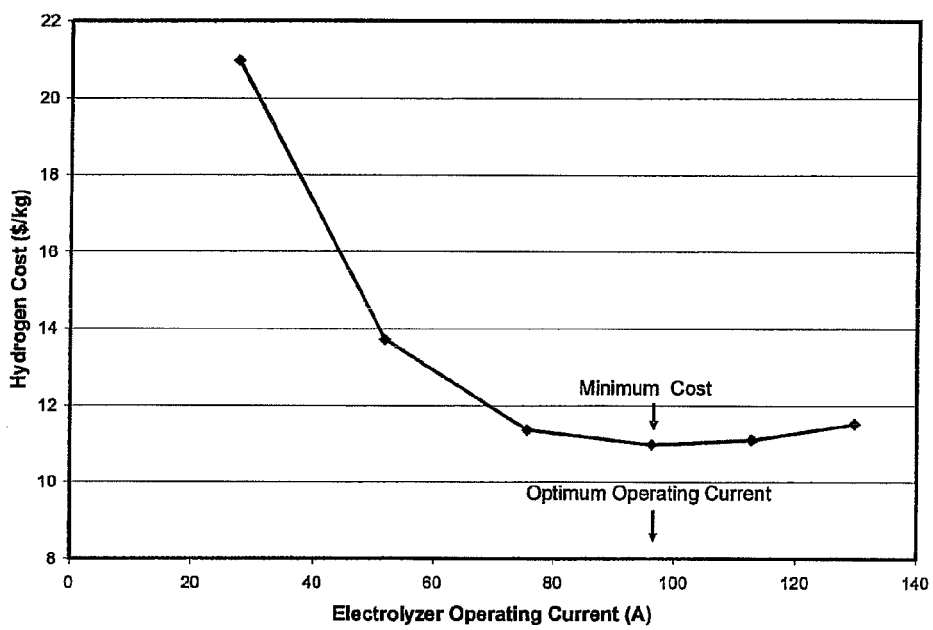
FIG. 3 illustrates the optimum operating current ($I_{opt}$) of the electrolyzer arrived at by plotting the hydrogen cost ($/kg) versus the electrolyzer operating current (A).

The optimum operating current ($I_{opt}$) of the electrolyzer is the electrolyzer operating current ($I_{oper}$) corresponding to the minimum hydrogen cost per unit amount. The value of $I_{opt}$ is used as the constant operating current for the 24-hour per day operation of the solar and grid powered electrolyzer system. As illustrated in FIG. 3, for a given electrolyzer, it is possible to determine the optimum operating current ($I_{opt}$) for the electrolyzer by plotting the unit hydrogen cost ($/kg) against $I_{oper}$ and choosing the $I_{oper}$ value that minimizes cost. The cost curve can pass through a minimum because the mass of hydrogen produced per day increases with increasing $I_{oper}$, but the efficiency of the electrolyzer, measured by the mass of hydrogen produced per unit of electrical energy input to the electrolyzer (kg/kWh), decreases with increasing $I_{oper}$.

The cost of hydrogen production with solar electricity sold to the utility power grid is calculated by equation 1, where $P_{opt}$ is the optimum power of the electrolyzer:

H₂ production cost ($/kg)=[PV system cost+electrolyzer cost+(Electricity buying price$_0$$^{24}$∫Grid power bought×$dt$)−(Electricity selling price$_0$$^{24}$∫Grid power sold×$dt$)]×33.35 kWh/kg/ ($P_{opt}$×Electrolyzer Efficiency×24 h)    (equation 1)

Using the lower heating value (LHV) of hydrogen (33.35 kWh/kg), the total hydrogen production is calculated using equation 2, where $I_{opt}$ is the optimum current, $V_{opt}$ is the optimum voltage of the electrolyzer, and $P_{opt}$ is the optimum power of the electrolyzer:

$$\text{Total } H_2 \text{ production} = [I_{opt} \times V_{opt} \times \text{Electrolyzer Efficiency} \quad \text{(equation 2)}$$
$$(\%) \times 24h/33.35 \text{ kWh/kg} \times$$
$$1/100\%$$
$$= [P_{opt} \times \text{Electrolyzer Efficiency}(\%) \times$$
$$24h/33.35 \text{ kWh/kg}] \times 1/100\%$$

The electrolyzer efficiency must be determined consistently using the water electrolysis potential of 1.23 volts at the LHV, where $V_{oper}$ is the operating voltage of the electrolyzer (equation 3):

Electrolyzer Efficiency (LHV)=100%×no. of electrolyzer cells in series×1.23 volts/$V_{oper}$    (equation 3)

In one embodiment of the invention, solar electricity produced by a solar and grid powered hydrogen generator is sold to a utility power grid with a constant electricity price ($/kWh). When the electricity price is the same for buying or selling electricity to the utility power grid at any time of day, the policy is called net metering. Under a utility policy of net metering, which already exists in many U.S. states, the electric meter charges the PV system owner for the net difference between the grid electricity bought and PV electricity sold, i.e., electricity bought minus electricity sold at the current price set by the utility.

In another embodiment, the solar electricity is sold to a utility power grid with a variable electricity price ($/kWh). If the electricity price for buying or selling electricity to the utility power grid can be negotiated with the utility company based on the electricity demand at the time of day, the policy may be called variable pricing. Peak electrical demand, with a potentially high electricity price, generally occurs about midday in cool weather and in the hottest part of the afternoon in summer in warm climates. Electricity demand is lowest at night, with a potentially reduced electricity price. Under a hypothetical "variable rate plan", the PV system owner would need to petition the utility to pay a higher rate than the net metering rate for the PV power sold to the utility during peak demand times, and to sell the PV owner power at a lower rate than the net metering rate for grid power to operate the electrolyzer during nighttime and any other low demand times.

Figure 4:
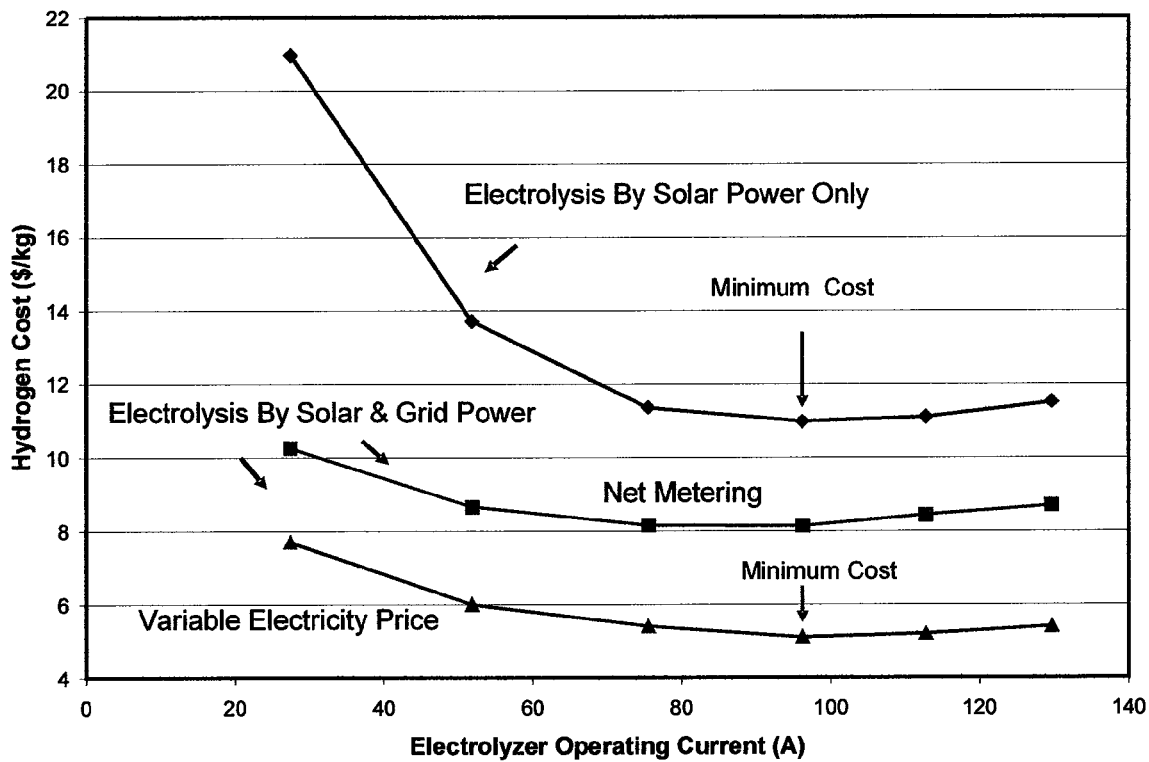
FIG. 4 illustrates the relationship between hydrogen cost ($/kg) and the electrolyzer operating current (A) for electrolysis by solar power only, electrolysis by solar and grid power using net metering, and electrolysis by solar and grid power using variable electricity price.

As illustrated in FIG. 4, the unit hydrogen cost ($/kg) varies depending on whether the power control system 12 uses only solar power or uses a combination of solar power and power from the utility grid. In addition, FIG. 4 illustrates that the unit hydrogen cost decreases when the PV system uses a variable electricity price based on the changing electrical demands during the day versus net metering. The embodiment in FIG. 4 is based on a 20-cell electrolyzer operated 24 hours a day in Las Vegas using electricity from a fixed angle PV array.

The above description of embodiments of the invention is merely exemplary in nature and, thus, variations thereof are not to be regarded as a departure from the spirit and scope of the invention.

What is claimed is:

1. A product comprising:
    a photovoltaic (PV) array and an electrolyzer operatively connected together and each operatively connected to a utility power grid so that electricity produced by the PV array is selectively delivered to the utility power grid and the electrolyzer;
    a potentiometer operatively connected to the electrolyzer;
    a variable DC DC converter operatively connected to the electrolyzer; and
    a switch operatively connecting the potentiometer and the variable DC DC converter to the PV array, wherein the switch selectively delivers electricity from the PV array to the potentiometer or the DC DC converter.

2. A product as set forth in claim 1, wherein at least a portion of the electricity produced by the PV array is delivered to the utility power grid when at least a portion of the electricity from the PV array is not desired for the electrolyzer.

3. A product as set forth in claim 1, further comprising a controller to control electricity flow so that electricity is selectively delivered from at least one of the PV array or the utility power grid to the electrolyzer.

4. A product as set forth in claim 3, wherein the total electricity flow to the electrolyzer corresponds to an optimum operating current for the electrolyzer that is predetermined to minimize the cost of hydrogen production.

5. A product as set forth in claim 1, further comprising a variable DC AC inverter electrically connected to the PV array and the utility power grid.

6. A product as set forth in claim 1, further comprising an ammeter electrically connected to the electrolyzer.

7. A product as set forth in claim 6, further comprising a variable AC DC converter electrically connected to the utility grid and the ammeter.

8. A product as set forth in claim 6, further comprising the potentiometer electrically connected to the PV array and the ammeter.

9. A product as set forth in claim 6, further comprising the variable DC DC converter electrically connected to the PV array and the ammeter.

10. A product comprising:
   a photovoltaic (PV) array;
   a variable DC AC inverter electrically connected to the PV array;
   a utility power grid electrically connected to the variable DC AC inverter;
   a variable AC DC converter electrically connected to the utility power grid;
   a variable DC DC converter and a potentiometer electrically connected to the PV array via an electrical switch, wherein the switch selectively connects the PV array to the DC DC converter or the potentiometer;
   an ammeter electrically connected to the variable AC DC converter the variable DC DC converter, and the potentiometer;
   an electrolyzer connected to the ammeter; and
   a controller constructed and arranged to control electricity flow to the electrolyzer from the PV array and the utility power grid.

* * * * *